Dec. 6, 1949  H. E. SPAETH  2,490,485
TANDEM WHEEL LANDING GEAR ASSEMBLY
Filed Oct. 30, 1947  2 Sheets-Sheet 2
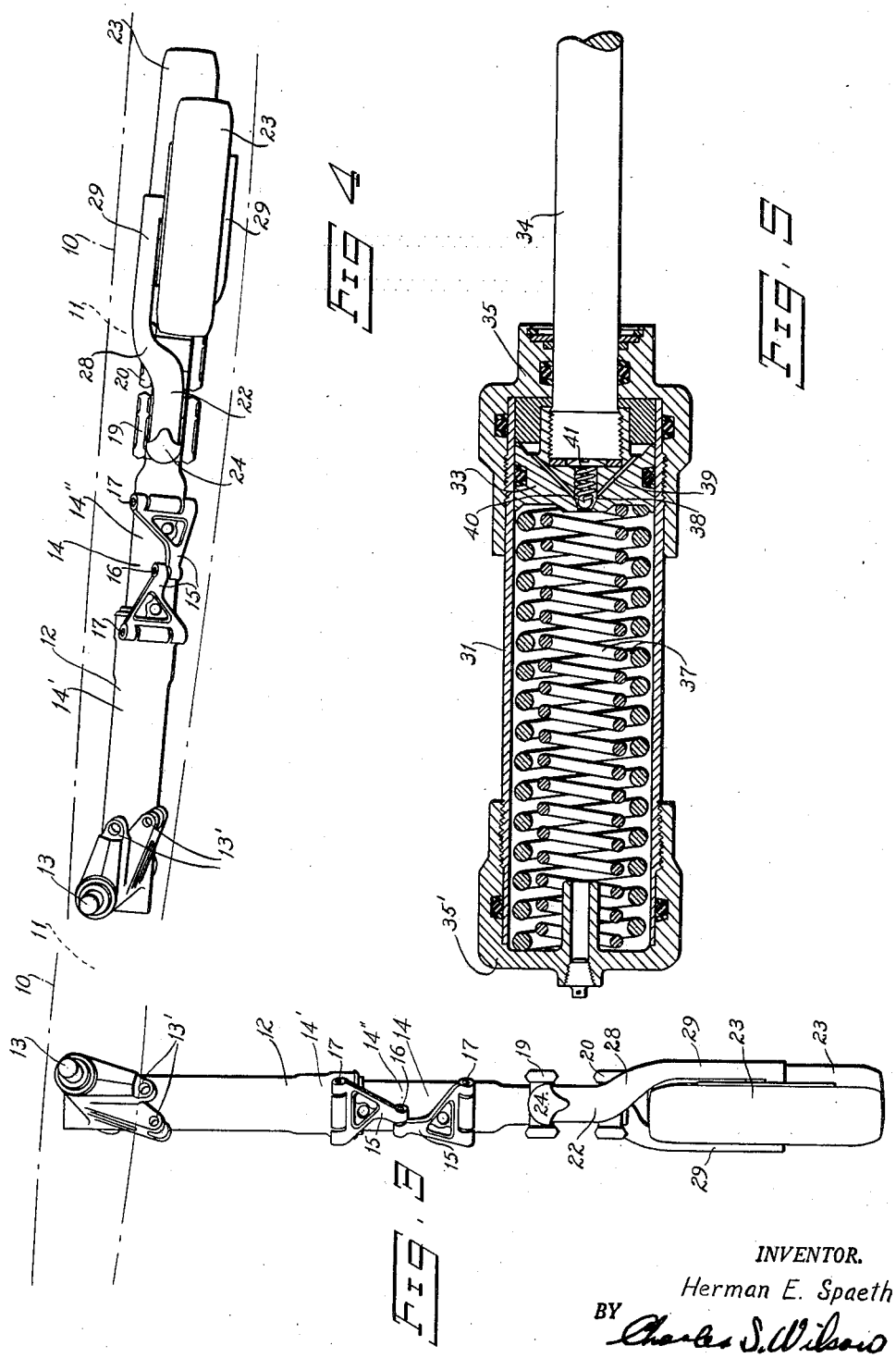
INVENTOR.
Herman E. Spaeth
BY Charles S. Wilson
ATTORNEY.

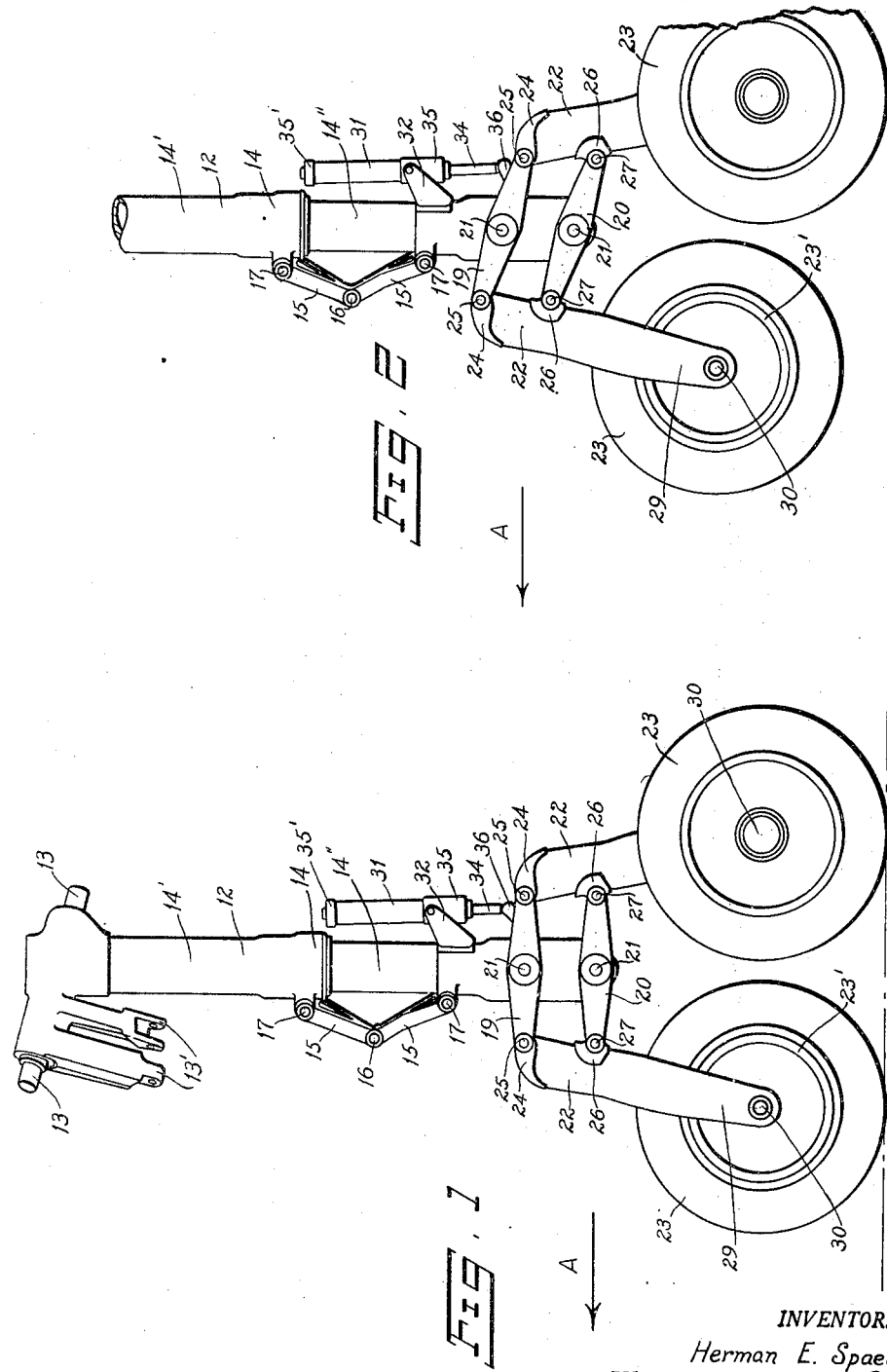

Patented Dec. 6, 1949

2,490,485

UNITED STATES PATENT OFFICE 2,490,485

TANDEM WHEEL LANDING GEAR ASSEMBLY

Herman E. Spaeth, Hempstead, N. Y., assignor to Republic Aviation Corporation, Farmingdale, N. Y., a corporation of Delaware Application October 30, 1947, Serial No. 783,144

4 Claims. (Cl. 244—102)

This invention relates generally to the mounting of vehicular wheels and proposes a multiple-wheel assembly or unit by which the carried or supported load or loads will be distributed among the several wheels of the unit and at the same time the wheels thereof are so coupled and mounted that, regardless of operating conditions, each individual wheel not only tends to contact and engage the plane of support but also supports its proportional share of the total load carried by the unit.

Among its other objects the present invention has in view a multiple wheel assembly or mounting structure wherein the wheels are so arranged and organized that vibrations or movements thereof relative to the plane of support are reduced in amplitude in a pre-determined proportion upon the transmission or application of such vibrations or movements to the load or loads being carried, supported or transported by the assembly.

While the instant multiple wheel assembly or unit is of general application and use it is especially designed for and adaptable to retractable landing gears, either main or auxiliary, of aircraft where its use reduces the critical space in wing or fuselage required for the reception of the retracted landing gear or wheels, provides multiple wheels for the support of the aircraft in landing or taxiing which combine to withstand the impact of landing, and equalizes and distributes the loads to the end that no one wheel of the unit or assembly receives the full load or can cease to function in supporting substantially its share of the full or total load applicable to the unit or assembly as a whole.

With the above and other objects in view, as will be apparent, this invention consists in the construction, combination and arrangement of parts all as hereinafter more fully described, claimed and illustrated in the accompanying drawings wherein:

Fig. 1 is a side elevation of a main landing gear unit of an aircraft constructed in accordance with the present invention, showing it fully loaded with the dual tandem wheels thereof in contact with the ground;

Fig. 2 is a similar view disclosing the positions assumed by the elements of the unit when the load is removed from the wheels, as when the aircraft becomes airborne;

Fig. 3 is an elevation taken at right angles to Fig. 1 to illustrate the landing gear assembly or unit protracted and secured to the wing of an airplane, the latter being shown in phantom;

Fig. 4 is a like view illustrating the landing gear assembly or unit retracted into a well in the under surface of the wing and the relative positions of the dual or multiple wheels thereof when so retracted; and Fig. 5 is an enlarged central longitudinal section through an acceptable type of positioning device for use in conjunction with the components of the multiple wheel unit or assembly.

Although the present wheel assembly and the principles employed therein can find extensive use in other fields and industries, it is essentially designed and intended for use as a landing gear unit in an aircraft or airplane and this adaptation and use thereof is specifically illustrated and described herein. The teachings of the present invention can be followed in adapting the structure herein shown and described to the tail or nose wheels or to the main landing gear of an airplane, but for illustrative purposes and for an understanding of the invention, it is shown and described in conjunction with one of the main landing gear units customarily mounted on and retractable into a well in a wing of an airplane, since this invention will probably find its greatest utility in this type of installation.

As the size of airplanes has increased, the diameters of the wheels of the main landing gear unit have also increased without any proportional or corresponding increase in the chord of the wing. Moreover, the high speeds presently attainable by aircraft utilize or require wings of constantly diminishing maximum thickness. Thus the factors of speed and/or size have been respectively responsible for a reduction of the space within the wing available for the retraction of the landing gear and for an increase in size (diameter as well as cross sectional area) of the landing gear wheels employed to support the airplane and to resist the impact of landing resulting from high landing speeds and/or the weight of the airplane.

The problem thus posed has heretofore been partially solved by the use of two wheels in each landing gear unit resting and operating parallel and adjacent while in their protracted or functioning positions. This parallel dual arrangement of the wheels of a landing gear unit not only reduced the diameter of the wheel well in the wing for the reception of the retracted unit but increased the depth thereof. As the wing, however, is becoming considerably and progressively thinner than heretofore generally employed in order to attain high speeds, it follows that the depth of wheel well required for these parallel and adjacent wheels cannot be provided in the wing. Manifestly, therefore, the solution of the problem by the use of parallel adjacent wheels of reduced size to support the weight of the airplane and withstand the landing impact has become impractical, if not obsolete, in airplanes having comparatively thin wings.

To obtain a practical solution for the problem multiple wheels arranged and organized in tandem have been tried in landing gear assemblies or units wherein the wheels of each assembly or unit are appreciably smaller in diameter and size than the corresponding single wheel that would otherwise be required, and each wheel has a thickness less than the thickness of a single wheel unit and very much less than the combined thickness of two wheels fixedly arranged parallel and adjacent. This tandem arrangement of the multiple wheels of a landing gear assembly or unit is such that when protracted or retracted the wheels are aligned one with the other in substantially the same plane. The multiple wheels, thus arranged in tandem, heretofore have been pivotally mounted by various means on or at the extremity of a landing gear strut to comprise an assembly, but it has been found that the pivotal mounting means heretofore employed has not been satisfactory because of the tendency of one or the other of the wheels of the unit to leave the ground or plane of support upon contacting an obstruction and also because the wheels of the unit were not provided with a coupling means which would always equalize or equally distribute the load between and among the several wheels of the assembly. In short the prior attempts to use multiple wheels organized in tandem have failed largely because of the difficulty in keeping all wheels of the assembly in operative contact with the ground and the resulting unequal load distribution among the wheels. This is particularly true in landing, both upon first contact of the wheels with the ground and upon application of the brakes, or taxiing over irregular ground surfaces when the prior arrangement of tandem wheels causes or permits the entire load to be shifted alternately from one wheel of the unit to another wheel of the same unit or assembly.

The present invention proposes to overcome the objections to these prior types of assemblies or units by incorporating in a tandem multiple wheel assembly a mounting by which its wheels are so secured to the extremity of the landing gear strut that they are always in substantially the same plane whether the landing gear be protracted or retracted and at any intermediate point between full protraction and full retraction as many of the prior assemblies have proposed. However, the present mounting also includes means by which the contact of a wheel of the assembly or unit with the ground or plane of support will always force the other wheel or wheels of the same assembly or unit into contact or engagement with the ground or plane of support and at the same time remain, itself, in contact and operative engagement with the ground and this is accomplished regardless of any irregularities in the surface of the ground or plane of support. In other words the instant mounting so supports and couples the wheels of a landing gear unit or assembly that they are incapable of individual movement relative to the ground or plane of support or relative to the strut and any possibility of any one wheel moving out of operative engagement therewith is positively and definitely counteracted. In short, if one wheel moves in one direction the companion must also move or tend to move in the opposite direction.

Reference being had more particularly to the drawings, 10 indicates the wing of an aircraft illustrated in phantom lines wherein an internal wheel well 11 for the reception and housing of a retracted landing gear unit is provided in any suitable manner and by any structural features. The landing gear unit 12 may be projected or protracted from the well 11 or retracted into the well at will and by any adaptable mechanism or instrumentality. For present purposes the landing gear unit or assembly 12 may be considered as comprising a shock strut, two or more landing gear wheels arrange in tandem, a mounting for securing the wheels as a unit to the extremity of the strut and coupling the individual wheels one to the other for specific and relative cooperation, and means whereby the wheels may be automatically positioned relative to one another when the entire load is removed therefrom, as when the airplane is airborne and during the protraction and/or retraction of the assembly. The particular mounting for the unit or assembly 12 in the wing 10 or the mechanism by which it is protracted or retracted form no part of this invention and therefore are neither illustrated nor described.

The shock strut 14 which forms a component of the assembly comprises an outer or upper cylinder 14' hinged by the trunnions 13 at one of its ends to a fitting within the wing so constructed that any desirable retracting and protracting mechanism (not shown) may be connected thereto at 13'; so that the unit 12 as a whole may be swung about the trunnions 13 from its protracted position illustrated in Fig. 3 to its retracted position illustrated in Fig. 4. The specific construction of the shock strut 14 and of its mounting by means of the trunnions 13 in association with the wing 10 and the mechanism by which it is swung about the trunnions 13 to and from its retracted position forms no part of the present invention. Any type of shock strut 14, or mounting of the trunnions 13, or the means by which the strut is swung about the trunnions may be used and these components of the assembly 12 can be considered as being conventional. However, in illustrating the present invention the outer cylinder 14' is shown as having a reciprocating piston or inner cylinder 14" telescoped for reciprocation in and relative to the cylinder 14'. Within the outer cylinder 14' is the shock absorbing feature or device provided to receive and diminish all shocks which otherwise should be imparted directly to the airplane from the wheels of the landing gear. A pair of torsion links 15 having their outer ends pivoted one to the other, as at 16, and their opposite extremities respectively pivoted to adjacent positions of the cylinders 14' and 14", as at 17, limit the vertical movement of the cylinder 14" relatively to the cylinder 14' and, especially, prevent any relative rotation by these cylinders.

As above noted all of the foregoing elements and components of the landing gear assembly or unit selected for illustrative purposes may be conventional and can be varied without limitation since they are merely background or environment for this invention.

At its lower end, i. e. the outer end of the inner or lower cylinder 14" the shock strut 14 has two pairs of parallel bars or levers 19 and 20 pivoted thereto centrally of their respective lengths. The pivots 21, by which these bars 19 and 20 are attached to the cylinder 14", are not only centrally positioned with respect to the lengths of the bars or levers but are aligned one with the other longitudinally of the strut 14 and the cylinder 14". In securing the pairs of bars or levers 19 and 20 to the cylinder 14" one bar or lever is disposed on each side of the cylinder and is aligned transversely thereof with its companion lever or bar.

In this manner two parallel levers or bars 19 and 20 are in effect provided but each actually consists of a pair of complemental levers medially connected one to the other and at corresponding ends these complemental levers are also interconnected by the attachment thereof to the wheels as will be described. To that end the several wheels 23 of the unit or assembly 12 are each provided with a yoke 22 and the upper end portion of each yoke is positioned between spaced, corresponding ends of both pairs of levers or bars 19 and 20 where it is pivotally connected to said bars or levers. A bracket 24 is rigidly and fixedly secured to and over the upper extremity of the yoke 22 at one side of the axis of the yoke for the reception and mounting of a pivot pin 25 which projects at its extremities beyond the bracket 24 to be pivotally engaged by the flanking ends of the upper bars or levers 19. By this arrangement the upper end of one yoke 22 is pivoted to and between the spaced ends of the upper levers or bars 19 while the other yoke 22 is similarly connected to and between the opposite ends of the same levers or bars. Below their upper extremities the yokes 22 each have a stud 26 fixedly secured thereto or integrally formed thereon to project from the yoke in the direction of the end of the shock strut 14. These studs 26 of the yokes 22 are each received between spaced, corresponding ends of the lower levers or bars 20 to which they are pivotally connected by the pivot pins 27 piercing the ends of said levers or bars 20 and the studs 26 situated between them. Thus one yoke 22 is pivoted to and between corresponding ends of the lower levers or bars 20 while the other yoke is pivoted to and between the opposite ends of the same lower levers or bars.

It is manifest from the foregoing that the pivotal connections between the levers or bars 19 and 20 and the shock strut 14 and between each yoke 22 and the coacting or adjacent extremities of levers or bars 19 and 20 creates a parallelogram at and attached to the outer end of the inner or lower cylinder 14" whereby said levers or bars forming two opposed sides of the parallelogram are at all times parallel one to the other. The remaining opposed sides of the parallelogram are not the yokes 22 but are lines between the centers of the pivot pins 25 and 27 on each side of the cylinder 14", which center lines are always parallel one to the other because of the positions of the bracket 24 and stud 26 on each yoke 22 and the positioning thereby of the pins 25 and 27 relative to the longitudinal axis of the yoke. This arrangement, or the provision of the stud 26 and bracket 24, maintains a parallelogram by compensating for any angle to the longitudinal axis of the strut 14 at which the yokes 22 or their longitudinal axes may be placed. Therefore while the yokes 22 per se in fact form a trapezoid with the bars or levers 19 and 20 in Fig. 1 the lines connecting the centers of the pivot pins 25 and 27 on each side of the strut are always parallel one to the other and form a parallelogram with levers 19 and 20 and this is also true in Fig. 2 where the axes of the yokes converge at different angles on the strut 14.

The parts of the yokes 22 situated above the wheels 23, including the end portions thereof associated with the levers or bars 19 and 20, rest in the same plane (see Figs. 3 and 4); but just above the peripheries or treads of the wheels 23 carried thereby the yokes 22 are bent at 28 in opposite directions to create an arm 29 below the bend 28 of each yoke lying parallel to the plane of the coating wheel. The extremity of each arm 29 has a transverse axle 30 secured to one side thereof to project toward the axis of the strut 14 and upon which the wheel 23 having a brake drum 23' is mounted for rotation. By reference to Figs. 3 and 4 it will be observed that the bends 28, being in opposite directions, are such that the arm 29 of one yoke 22 is spaced laterally of the strut 14 from the arm 29 of the companion yoke a distance approximating the thickness of one of the wheels 23 carried by the axles 30 of the yokes. Thus and in this manner the wheels 23 are in substantial fore and aft alignment whether the landing gear assembly or unit 12 is protracted or retracted and at no time do both of the wheels 23 ever occupy appreciably more space normal to the axis of the strut 14 than substantially that required by but one wheel.

The bars or levers 19 and 20 by and through which the two wheels of the assembly are mounted on and secured to the strut 14 can swing or move about or on the pivot pins 21 even when the assembly is protracted and carrying a load as shown in Fig. 1. As will be later described, this movement of the arms 19 and 20 about their pivots 21 is limited by a positioning device which becomes operative only when the load is removed from the wheels on and after takeoff and prior to retraction, as shown in Fig. 2. However, when the wheels are supporting the load as shown in Fig. 1, the positioning device is relatively ineffective so that the bars or levers 19 and 20, for all practical purposes, have complete freedom of pivotal movement relatively to the pivots 21 and to the strut 14. Since each yoke 22 is pivoted to the adjacent extremities of both bars 19 and 20, the wheels 23 are, as above pointed out, supported on and carried by the strut 14 by means of a parallelogram consisting of the bars or levers 19 and 20 and the lines between the centers of pivot pins 25 and 27 secured to each yoke 22. This organization of levers, pivots, yokes, etc. is such that as the wheels 23 operate over and across obstructions or the irregularities in the ground or plane of support, an oscillation of the levers or bars 19 and 20 about their pivots 21 will occur and during this movement or oscillation the bars or levers 19 and 20 always remain parallel one to the other and while the relative positions of the yokes 22 may change during this movement of the bars or levers relatively to the strut 14 the lines between the centers of the pivot pins 25—27 on each side of the strut will always be approximately parallel.

In the mounting of dual tandem wheels heretofore employed the wheels have been pivoted to the extremities of a shock strut by independent links or by a single fore and aft bar pivoted to the wheels and to the strut. With these prior structures when the leading wheel of the assembly contacted an obstruction there developed a tendency on the part of the bar or link supporting the wheel or wheels to rotate about its pivotal connection to the strut thereby overloading the other wheel of the tandem pair. Also, on occasion, one of the wheels would be thrown completely out of contact with the ground transferring the entire load borne by the unit to the other of the dual assembly; and sometimes the rotation of the bar or links would continue till this movement was arrested by some outside means. Again when, in the application of brakes to the wheels of the unit, greater braking force was applied to the leading wheel than that applied to the trailing wheel of the tandem, this tendency of the bar or links supporting the tandem wheels to rotate about the pivotal connection thereof to the strut of the assembly would develop regardless of ground irregularities or obstructions. Thus, whenever this tendency occurred or the trailing wheel actually left the ground the entire load to be supported by both wheels was transferred to one wheel which obviously was designed to carry only substantially one-half of that load.

With the present invention this is impossible, for the tendency of both wheels 23 in the instant assembly or unit is to engage or move toward the ground or plane of support. For example, in Fig. 1 the arrow A represents the direction of travel of the assembly, therefore the wheel 23 to the left in that figure is the leading wheel and the wheel 23 to the right is the trailing wheel. Under these conditions, if the leading wheel contacts an obstacle or any irregularity in the surface travelled upon tending to cause it to leave the ground that tendency is counteracted by the trailing wheel 23 in engagement with the ground or terrain acting through the levers or bars 19 and 20. Moreover, with the present landing gear assembly and by its use of the parallelogram above described, any tendency of the bars 19 and 20 to rotate about their pivots 21 is counteracted by the engagement of either or both of the wheels 23 with the ground; so that regardless of operating conditions, there is no tendency of either wheel 23 to leave the ground nor is there any tendency on the part of the bars 19 and 20 to rotate about their respective pivots 21 in the direction of travel.

It is to be noted also that any vertical movement or vibration of either wheel 23 with respect to the plane of support or ground due to irregularities in the plane of support is reduced in being applied to the strut 14 and the cylinder 14". This is obviously due to the pivotal mounting of the bars 19 and 20 and the connections thereof to the yokes 22 and the ratio of this reduction is determined by the lengths of the levers 19 and 20.

When the load is removed from the wheels 23 of the assembly or unit 12 and/or during the protraction or retraction thereof with respect to the well 11 in the wing 10, the bars or levers 19 and 20 together with the yokes 22 would, in the absence of any control or restraint, be free to move about their various pivots so that the wheels would dangle somewhat loosely and cause flutter or vibration. Moreover this free and loose potential movement of the pivotal components of the assembly or unit 12 can cause non-alignment of the wheels 23 with the wheel well 11 as the unit is being completely retracted. It is therefore proposed by the present invention to interpose a positioning device or mechanism between one of the bars or levers 19 or 20 and the strut 14, which will cause the wheels 23 to automatically assume a predetermined position, such as shown in Figs. 2 and 4, if and when the load is removed from the wheels or the plane is airborne and which will retain and hold them in that position to prevent any relative movement of the components of the assembly or unit 12. This positioning device can, if desired, be also employed to so relatively position the components of the unit or assembly 12 that a minimum or reduced area or space within the wing would be required to house the wheels 23.

Any one of a number of positioning devices may be employed for this purpose. One is illustrated in detail in Fig. 5 and is shown mounted on or incorporated in the assembly or unit 12 in Figs. 1 and 2. The illustrated type of positioning device consists of a cylinder 31 pivotally mounted adjacent one of its ends on a bracket 32 secured to and projecting from the end portion of the inner or lower cylinder 14" of the strut 14 above the upper bar or lever 19, and in general opposition transversely of the strut 14 to the torsion links 15. This cylinder 31 has a piston 33 mounted for reciprocation therein to which is attached a piston rod 34 passing concentrically through the lower cylinder head 35 to be pivotally secured at 36 to the adjacent end of the upper bar or lever 19. Housed within the cylinder 31 between the piston 33 and the upper cylinder head 35', is a pair of concentric helical coil springs 37. These springs 37, if free to act on the piston 33, force it and the piston rod 34 in a downward direction (Figs. 1 and 2) and unless restrained by contact of the wheels 23 with the ground cause the yokes 22 and bars or levers 19 and 20 to assume the positions shown in Fig. 2 i. e. they rotate the bars or levers 19 and 20 on their respective pivots 21 and thereby move the yokes 22 in opposite directions. A concentric metering orifice 38 is provided in the piston 33 through and in combination with which the passages 39 in the piston 33 connect the opposite faces of said piston. The undersized spherical metering valve 40 is situated in the orifice 38 and is held seated in a position to almost completely close the mouth of said orifice by the coil spring 41.

With the parts shown as illustrated in Fig. 5, the cylinder 31 is filled with oil or any other hydraulic fluid to surround the springs 37. The parts or elements of the positioning device are as shown in Fig. 5 when the airplane is airborne to locate the components of the landing gear assembly or unit as shown in Fig. 2. When, however, the wheels 23 contact the ground and receive the impact of landing, as well as the full load of the plane, the piston rod 34 is forced upwardly thereby against not only the action of the springs 37 but also against the yielding pressure of the fluid or oil within the cylinder 31 between the head 35' and the piston 33. The pressure thus placed on the hydraulic fluid within the cylinder 31 causes the spherical metering valve 40 to move against the action of the spring 41 away from its seat to permit the fluid within the cylinder to flow freely and rapidly through the orifice 38 and the passages 39 to the opposite side of the piston 33. Thus as the piston moves toward the cylinder head 35', compressing the springs 37 and transferring the fluid to its opposite side, i. e. to the chamber within the cylinder defined by the piston 33 and the cylinder head 35, the parts of the device assume positions the reverse of those shown in Fig. 5 and the components of the wheel assembly or unit 12 assume the positions shown in Fig. 1. Thereafter when the plane is again airborne and the load is removed from the wheels 23, the springs 37 of the positioning device force the piston 33 toward the cylinder head 35 so that it eventually returns to the position shown in Fig. 5. This movement causes the piston 33 to exert a pressure on the fluid between it and the cylinder head 35 that causes the oil or fluid to pass or seep through the passages 39 and around the valve 40 and to the chamber in the cylinder 31 defined by the cylinder head 35' and the piston 33. Eventually, as the hydraulic fluid passes from one side of the piston 33 to the other, the parts of the positioning device assume the positions shown in Fig. 5 and the components of the wheel assembly or unit 12 assume the positions shown in Fig. 2.

As noted above, the positioning device shown in Fig. 5 is merely an example of a number of devices capable of being employed to position the wheels 23 as shown in Fig. 2 when the plane is airborne. The specific structure embodied in this or the device per se forms no part of the present invention. The essence of this feature of the present invention resides in the combination of an automatic positioning device with the present multiple wheel landing gear assembly or unit wherein the wheels are arranged in tandem and are coupled and mounted to prevent and restrain any bodily rotation of the links, levers or bars carrying or supporting the wheels relative to the shock strut and to positively counteract any accidental movement of either wheel in a direction away from the plane of support.

What is claimed is:

1. In an aircraft landing gear assembly the combination with a strut, of a pair of transversely extending levers pivoted centrally of their lengths to said strut, the pivots whereof align one with the other longitudinally of the strut, a pair of wheel yokes, one yoke being pivoted to the ends of both levers on either side of the strut, wheels rotatably carried at the outer ends of said yokes to be positioned thereby in substantially fore and aft alignment in a common plane, and means interposed and operable between the strut and said levers to automatically move the components of the assembly to and resiliently hold them in predetermined positions with the treads of the wheels out of their normal common operating plane upon removal of the load from said wheels.

2. In an aircraft landing gear assembly the combination with a strut, of a pair of transverse levers, each pivoted medially of its length to and projecting at its ends laterally beyond said strut, the pivots of both levers being aligned one with the other longitudinally of the strut, a yoke located on each side of the strut, a pair of mounting members fixed to each yoke to project laterally therefrom, one of said members being pivoted to the adjacent projecting extremity of one of the levers, the centers of the pivots of the yoke on one side of the strut being on a line parallel to the line of the pivots of the yoke on the other side of the strut, an axle at the end of each yoke projecting transversely therefrom toward the opposite yoke, and a wheel mounted for rotation on each axle, said yokes being bent outwardly in opposite directions to position the wheels carried thereby substantially in a common plane.

3. In an aircraft landing gear assembly the combination with a strut, of a pair of transverse, parallel levers each pivoted medially of its length to said strut, the pivots of both levers being aligned one with the other longitudinally of the strut, a yoke on each side of the strut at the corresponding ends of said levers, plural means disposed laterally of the axis of each yoke to be pivoted to the adjacent projecting extremities of both levers, the line of the centers of the pivots of one yoke being parallel to the line of the centers of the pivots of the other yoke, an axle at the outer end of each yoke projecting therefrom toward the opposite yoke, a wheel mounted for rotation on each axle, and means incorporated in the yokes to position the wheels in a common plane, with the strut and the upper portions of the yokes extending above the peripheries of said wheels.

4. In an aircraft landing gear assembly the combination with a strut, of a pair of transverse, parallel levers each pivoted medially of its length to said strut and the pivots of both levers being aligned one with the other longitudinally of the strut, a yoke pivoted to the extremities of both levers on each side of the strut, the center line of the pivots of one yoke being parallel to the center line of the pivots of the other yoke, an axle at the outer end of each yoke projecting therefrom toward the opposite yoke, and a wheel mounted for rotation on each axle, said yokes being oppositely bent to space and position the lower portions thereof carrying the axles parallel one to the other and to the axis of the strut and locate said wheels in substantially the same plane as the strut and the portions of the yokes disposed above the peripheries of the wheels.

HERMAN E. SPAETH.

REFERENCES CITED

The following references are of record in the file of this patent:

UNITED STATES PATENTS

| Number | Name | Date |
| --- | --- | --- |
| 1,852,230 | Breguet | Apr. 5, 1932 |
| 2,222,857 | Ronning | Nov. 26, 1940 |
| 2,392,905 | Dowty | Jan. 15, 1946 |